(12) United States Patent
Santos et al.

(10) Patent No.: US 12,278,480 B2
(45) Date of Patent: Apr. 15, 2025

(54) POWER HIGH-DENSITY DC/DC CONVERSION SYSTEM WITH OVERVOLTAGE PROTECTION FOR ENERGY TRANSMISSION BY UMBILICAL CABLES CONNECTED TO ROBOTIC SYSTEMS IN LONG PIPELINES

(71) Applicants: PETRÓLEO BRASILEIRO S.A.—PETROBRAS, Rio de Janeiro (BR); SERVIÇO NACIONAL DE APRENDIZAGEM INDUSTRIAL DEPARTAMENTO REGIONAL DE SANTA CATARINA—SENAI/SC, Florianópolis (BR)

(72) Inventors: Hugo Francisco Lisboa Santos, Rio de Janeiro (BR); Leonardo Sostmeyer Mai, Florianópolis (BR); Renato Ferreira Simão, Florianópolis (BR); Willian Henrique, Florianópolis (BR); Anselmo Luís Da Silva, Jr., Florianópolis (BR); Ney Robinson Salvi Dos Reis, Rio de Janeiro (BR); Fabrizio Piccoli Maziero, Florianópolis (BR)

(73) Assignees: PETRÓLEO BRASILEIRO S.A.—PETROBRAS, Rio de Janeiro (BR); SERVIÇO NACIONAL DE APRENDIZAGEM INDUSTRIAL DEPARTAMENTO REGIONAL DE SANTA CATARINA—SENAI/SC, Florianopolis (BR)

( * ) Notice: Subject to any disclaimer, the term of this patent is extended or adjusted under 35 U.S.C. 154(b) by 85 days.

(21) Appl. No.: 17/894,383

(22) Filed: Aug. 24, 2022

(65) Prior Publication Data
US 2023/0076656 A1 Mar. 9, 2023

(30) Foreign Application Priority Data

Aug. 25, 2021 (BR) .......................... 1020210168250

(51) Int. Cl.
*H02H 7/12* (2006.01)
*G05F 3/18* (2006.01)
(Continued)

(52) U.S. Cl.
CPC .......... *H02H 7/1213* (2013.01); *H02M 1/007* (2021.05); *H02M 3/1584* (2013.01);
(Continued)

(58) Field of Classification Search
CPC ...... H02H 7/005; H02H 7/1213; H02H 9/045; H02M 1/0043; H02M 1/007;
(Continued)

(56) References Cited

U.S. PATENT DOCUMENTS 6,473,284 B1 * 10/2002 Ilic ........................ H02M 3/155
361/91.1
2002/0181261 A1 * 12/2002 Gaudreau ......... H02M 3/33569
363/108

(Continued)

FOREIGN PATENT DOCUMENTS

BR   112012005207   3/2016
BR   102018015804   2/2020
(Continued)

OTHER PUBLICATIONS

Lai, R. et al., "A Modular Subsea DC Electrical Power System," Paper presented at the Offshore Technology Conference, Houston, Texas, May 2014. doi: https://doi.org/10.4043/25263-MS. Obtained from https://onepetro.org/ on Mar. 21, 2024. (Year: 2024).*

(Continued)

*Primary Examiner* — Fred E Finch, III
(74) *Attorney, Agent, or Firm* — Troutman Pepper Locke LLP

(57) ABSTRACT

The system proposed in this invention allows the conversion of energy from an AC/DC source, located on a platform (surface) and transmitted through an umbilical to a robot that operates on flexible lines, converting the electrical voltage to levels suitable for supplying the robotic system, and can also be used for supplying other pieces of equipment that operate with low voltage and require power high-density and protection against voltage transients.

The system of the invention consists of a surface source (2), fed by the platform's three-phase grid (1), an umbilical cable (3), which connects the source to the robot, an overvoltage protection circuit (4), and a two-stage conversion modular system (5 and 6).

20 Claims, 4 Drawing Sheets

(51) Int. Cl.
| | | |
|---|---|---|
| *H02M 1/00* | (2007.01) | |
| *H02M 3/158* | (2006.01) | |
| *H02H 7/00* | (2006.01) | |
| *H02H 9/04* | (2006.01) | |

(52) U.S. Cl.
CPC .............. *G05F 3/18* (2013.01); *H02H 7/005* (2013.01); *H02H 9/045* (2013.01); *H02M 1/008* (2021.05)

(58) Field of Classification Search
CPC .............. H02M 1/0074; H02M 1/008; H02M 3/1584–1586; H02M 3/285; H02J 1/06
See application file for complete search history.

(56) References Cited

U.S. PATENT DOCUMENTS

| | | | | |
|---|---|---|---|---|
| 2003/0102720 A1* | 6/2003 | Baggs | ................. | E21B 33/0355 340/853.1 |
| 2004/0130215 A1* | 7/2004 | Muramatsu | ............. | B60L 53/20 307/69 |
| 2005/0029476 A1* | 2/2005 | Biester | ................. | F16K 31/046 251/58 |
| 2008/0122573 A1 | 5/2008 | Ulaner et al. | | |
| 2009/0261653 A1* | 10/2009 | Furukawa | ............... | H02J 1/002 307/31 |
| 2012/0267955 A1* | 10/2012 | Zhan | ......................... | H02J 1/06 307/31 |
| 2013/0265683 A1* | 10/2013 | Gueltig | .................... | G05F 1/56 361/86 |
| 2013/0335043 A1* | 12/2013 | He | .......................... | H02M 3/08 323/234 |
| 2016/0126726 A1* | 5/2016 | Chi | ......................... | H02H 7/10 361/56 |
| 2018/0301980 A1* | 10/2018 | Keister | ................. | H02M 1/088 |
| 2019/0068067 A1* | 2/2019 | Butler | .................... | H02M 1/32 |
| 2019/0157861 A1* | 5/2019 | Sonne | .................... | H02H 9/045 |
| 2023/0406469 A1* | 12/2023 | Liu | .......................... | H02J 4/00 |

FOREIGN PATENT DOCUMENTS

| | | | |
|---|---|---|---|
| BR | 102018072062 | | 5/2020 |
| BR | 102019012853 | | 12/2020 |
| BR | 102019012854 | | 12/2020 |
| BR | 102019013128 | | 1/2021 |
| CN | 202759384 U | * | 2/2013 |
| GB | 2557698 A | | 6/2018 |

OTHER PUBLICATIONS

Harris, D. W. et al., "Powering cabled ocean-bottom observatories," in IEEE Journal of Oceanic Engineering, vol. 27, No. 2, pp. 202-211, Apr. 2002. Obtained on Sep. 26, 2024. doi: 10.1109/JOE.2002.1002474 (Year: 2002).*

Petitt, R. A. et al., "The Hawaii-2 Observatory," IEEE Journal of Oceanic Engineering, vol. 27, No. 2, pp. 245-253, Apr. 2002. Obtained on Sep. 26, 2024. doi: 10.1109/JOE.2002.1002479 (Year: 2002).*

Howe, B.M. et al. (2015). The ALOHA cabled observatory. In: Seafloor Observatories. Springer Praxis Books(). Springer, Berlin, Heidelberg. https://doi.org/10.1007/978-3-642-11374-1_17 (Year: 2015).*

Chen, Yh. et al., "Power system design for constant current subsea observatories," Front Inform Technol Electron Eng, vol. 20, pp. 1505-1515, Nov. 2019. Obtained on Sep. 26, 2024. https://doi.org/10.1631/FITEE.1800362 (Year: 2019).*

Machine translation of CN-202759384-U, Feb. 27, 2013. (Year: 2013).*

* cited by examiner

POWER HIGH-DENSITY DC/DC CONVERSION SYSTEM WITH OVERVOLTAGE PROTECTION FOR ENERGY TRANSMISSION BY UMBILICAL CABLES CONNECTED TO ROBOTIC SYSTEMS IN LONG PIPELINES

CROSS-REFERENCE TO RELATED APPLICATION

This application claims priority to Brazilian Application No. 1020210168250 filed on Aug. 25, 2021 and entitled "POWER HIGH-DENSITY DC/DC CONVERSION SYSTEM WITH OVERVOLTAGE PROTECTION FOR ENERGY TRANSMISSION BY UMBILICAL CABLES CONNECTED TO ROBOTIC SYSTEMS IN LONG PIPELINES."

FIELD OF THE INVENTION

The present invention is based on the development of a solution to perform the conversion of energy from an AC/DC source located on the platform (surface) and transmitted through an umbilical to a robotic system that operates on subsea flexible lines, converting electrical voltage to adequate levels for supplying this robotic system, and can also be used to supply other pieces of equipment that operate with low voltage and require power high-density and protection against voltage transients.

DESCRIPTION OF THE STATE OF THE ART

For the operation of a robotic system of intervention in pipes, it is necessary that the equipment is fed through an umbilical from the surface, and the length of this umbilical often reaches a few tens of kilometers. Due to the ohmic losses in the electrical conductors of the umbilical, the transmission of energy with high levels of electrical current causes a high voltage loss, consequently implying larger sections of electrical conductors. In this way, energy transmission is more efficient when performed at a higher voltage level, reducing voltage drop and Joule effect losses.

However, the transmission of energy at a higher potential makes it necessary to perform a new conversion of this energy on the robot side, transforming it to a level suitable for the operation of the pieces of equipment inside the pipe. Due to the reduced dimensions of the pipe, it is therefore necessary that the converters have high energy density and high efficiency.

Another problem that occurs when using a long umbilical is the appearance of voltage peaks and oscillations at the point of energy delivery. These disturbances are caused by the interaction of parasitic reactive elements (capacitances and inductances) of the umbilical at the moment when load variations occur, such as when connecting and/or disconnecting the piece of equipment connected to the same. In order for the pieces of equipment connected to this umbilical to operate correctly, therefore, an overvoltage protection system is required.

The intervention in flexible lines can be performed externally, using ROVs (Remotely Operated Vehicles). These subsea vehicles have large dimensions and, therefore, there are not many restrictions regarding the dimensions of the on-board energy conversion system. However, ROVs generally operate at depths of up to 3 km, due to power system restrictions.

The Annelida robot (BR 10 2018 015804-0; BR 10 2018 072062-7; BR 10 2019 012853-4; BR 10 2019 013128-4; BR 10 2019 012854-2), in turn, was designed to carry out the intervention internally in small diameter blocked flexible lines. In the specific case, a diameter of 4 inches (10.16 cm), which limits its dimensions to about 3 inches (7.62 cm) in diameter. Considering that the energy consumption of robots is high (that of Annelida robot in particular is up to 4 kW), their supply system must be able to process this energy by conforming the dimensions of the same to the internal diameter of the pipe. It was not possible to find in the state of the art a supply system capable of processing high powers (for example 4 kW) with a high input voltage (for example between 630 V and 700 V) and an output voltage regulated in extra low voltage (for example 48 V), meeting the geometric constraints of inner diameter and radius of curvature (for example, less than 4 inches (10.16 cm)).

The present invention proposes a system to carry out the conversion of energy from a DC source located at a great distance (for example on a platform) and transmitted through an umbilical to a robotic system that operates on subsea flexible lines, converting the electrical voltage to levels suitable for supplying the robot. The system comprises a surface source, which is powered by the platform's three-phase grid, an umbilical cable that connects the source to the robot, an overvoltage protection circuit, and a two-stage conversion modular system. The overvoltage protection circuit clamps the voltage at the umbilical output to acceptable levels for the operation of unregulated converter modules.

Document GB2557698A discloses an ROV comprising a number of electrical systems such as motors, lights, tools, etc. Instruments and lights typically require a 10-kW supply source. Hydraulic motor drives and tools typically require a 50-kW supply source. The ROV is connected to a DC supply source on a ship via an electrically conductive umbilical cable. The DC supply source typically supplies a DC voltage of around 3000 to 5000 Volts. ROV systems typically require a voltage of about 120 Volts. Consequently, a DC-DC voltage converter is arranged between the end of the umbilical cable and the ROV. The DC/DC voltage converter converts the input DC voltage into a plurality of 120-Volt DC outputs. Each system is connected to a separate DC output. The document, however, does not disclose an overvoltage protection circuit that clamps the voltage at the umbilical output (connection to the robot) at acceptable levels for the operation of unregulated converter modules, such as the present invention. Additionally, such vehicles do not have significant dimensional restrictions.

Document BR112012005207A2 discloses an energy transmission and distribution system comprising a main DC transmission cable, a main subsea energy distribution unit, having a DC/DC converter module connected between the main DC transmission cable and the main DC distribution grid, a secondary subsea energy distribution unit, having a DC/DC converter module connected between the main DC distribution grid and a secondary DC distribution grid, one or more subsea electrical loads connected to the secondary DC distribution grid. The document does not disclose an overvoltage protection circuit such as this invention. Again, there are no significant dimensional restrictions.

Document US20080122573A1 discloses an apparatus for clamping voltage in a line to a desired voltage and configured to receive a test voltage, which includes: a varistor coupled to the line, with characteristics of a capacitor, with first signals exceeding a first frequency and having Zener characteristics, a spark gap setting a second breakdown voltage equal to the desired voltage, coupled to the varistor, and a passive direct current element coupled in parallel with the spark gap. The text does not disclose subsea DC/DC converters in at least two stages of conversion, enabling the delivery of energy from a surface platform to a robot, so that said robot performs subsea interventions, such as the present invention. Again, there are no significant dimensional constraints.

Particularly, the priorities presented are not able to provide the adequate voltage for the robot operation in an environment that is inside an obstructed line, as is the case of this invention.

Objective of the Invention

It is an objective of the invention to provide a supply system for robotic equipment operating on flexible non-pigable lines, capable of processing high powers (for example 4 kW) with a high input voltage (for example, 630 to 700 V) and a low, regulated output voltage (for example, 48 V).

BRIEF DESCRIPTION OF THE INVENTION

The present invention presents a supply system that allows a robot operating in flexible pipes to be supplied with high voltages (for example, 700 V), causing energy losses in the umbilical to be minimized, since for voltages higher, the current required for the same power will be lower. This makes it possible for the robot to operate with longer umbilicals. An overvoltage protection system mitigates voltage spikes caused by the dynamics between load variations with the parasitic impedances of the umbilical. With this, it is possible to operate the robot safely using umbilicals of several kilometers in length.

Two-stage modular converters firstly convert the voltage from high values (for example, 700 V) to a lower voltage unregulated bus (for example, 40 V) and then to a bus regulated at the voltage of operation (for example, 48 V), used by the rest of the robotic system. The modular structure of the robot, in addition to increasing reliability due to redundancy, allows the converters to be distributed in more than one segment of the robot, meeting the size restriction of the application.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

There follows below a detailed description of a preferred embodiment of the present invention, by way of example and in no way limiting. Nevertheless, it will be clear to a technician skilled on the subject, from reading this description, possible further embodiments of the present invention still encompassed by the essential and optional features below.

Figure 1:
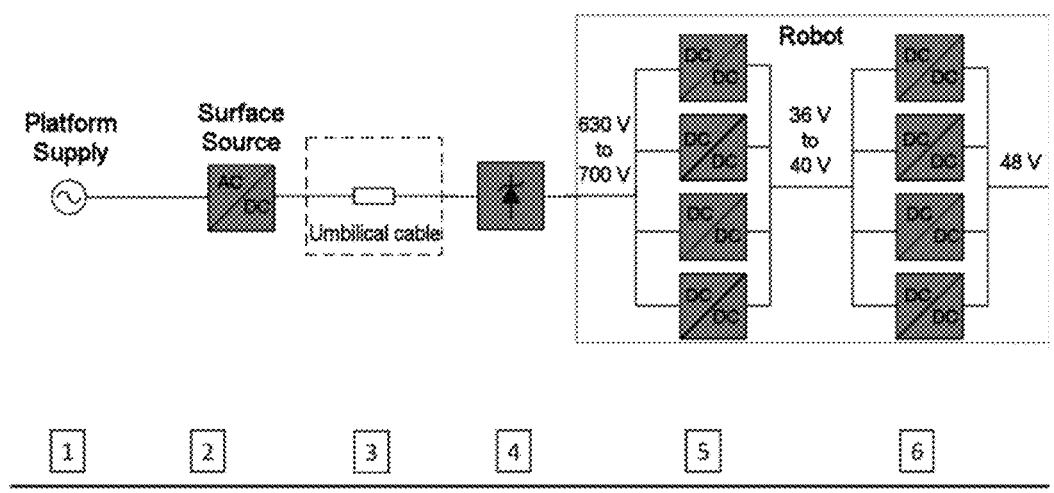
FIG. 1, which illustrates the supply system proposed in this invention.

As illustrated in FIG. 1, the system proposed in this invention consists of a surface source (2) (AC/DC—0 to 800 V, 8 kW), which is powered by the three-phase grid of the platform (1) (440 V RMS), an umbilical cable (3) up to 15 km long, which connects the source with the robot, an overvoltage protection circuit (4), and a two-stage conversion modular system (5 and 6) (4×1 kW).

The first conversion stage (5) uses modules to reduce the voltage level with high energy density, lowering the input voltage (between 630 V and 700 V) to values between 36 V and 42 V, creating a medium bus that varies from according to the input voltage. These modules are not regulated: that is, their output voltage varies as a function of the input voltage, according to a fixed transformation factor of approximately 16:1, and they can be connected in parallel in order to increase the maximum processed power.

As to the second conversion stage (6), regulated voltage booster/reducer modules are used, connected to the medium bus and responsible for the final regulation for the desired voltage levels. The use of a two-stage conversion topology is advantageous, as it allows the creation of several voltage buses from the same medium bus. In addition to creating several buses of different voltages, these modules can be connected in parallel in order to increase the maximum processed power.

Figure 2:
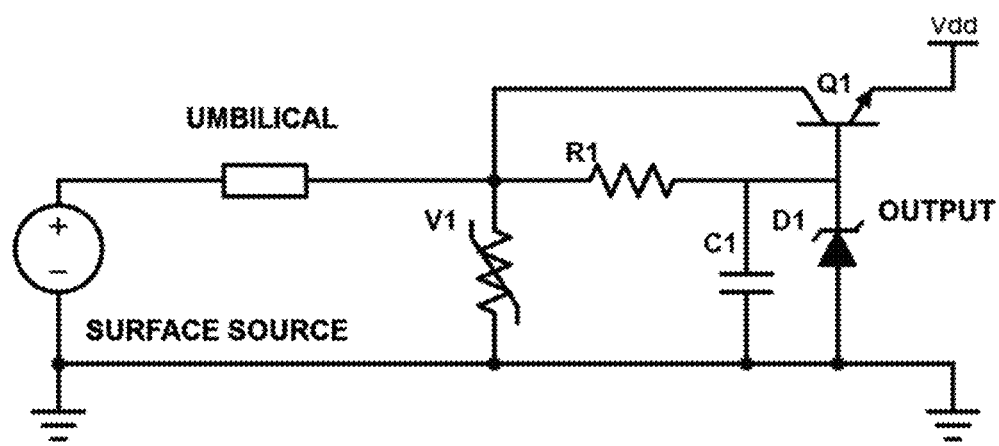
FIG. 2, which illustrates a schematic of the Overvoltage Protection System.

The overvoltage protection circuit, in turn, clamps the voltage at the umbilical output (connection to the robot) at acceptable levels for the operation of unregulated converter modules. The most basic and fundamental component of the protection system is the varistor (V1), located right after the umbilical (FIG. 2), whose function is to absorb excess energy in the event of an overvoltage. The varistor is a component with variable resistance as a function of the voltage applied across its terminals. This component is capable of absorbing energy from voltage spikes; however, its clamping occurs at a difference of electrical potential that is still too high for the input of unregulated converters.

Thus, a linear protection circuit was included after the varistor, consisting of an NPN bipolar transistor (Q1) and an array of Zener diodes (D1) clamping the base voltage. The output voltage of the protection circuit is configured by means of a series arrangement of Zener diodes (D1).

For this application, the maximum output voltage was defined as 720 V, or 4 180 V diodes in series. Thus, with the varistor clamping the voltage at the input of the circuit at 1430 V and the linear circuit regulating the voltage at the input of the converters at 720 V, the voltage difference will be 710 V, a value below the maximum supported by the transistor. In addition, an RC low-pass filter is added to the base of the transistor in order to filter out possible oscillations arising from the resonance generated by the parasitic impedances of the umbilical. With the application of the protection circuit, the voltage at the input of the unregulated modules is restricted to the difference of potential configured by the association of Zener diodes in series.

The regulated bus output voltage can be easily configured, through a resistor, to values between 0 V and 60 V, with an output current of up to 40 A per module. The configuration applied to the Annelida robot presents a 48 V regulated bus, with an association of 4 modules in parallel, allowing the supply of 80 A of electrical current to the load.

Figure 3:
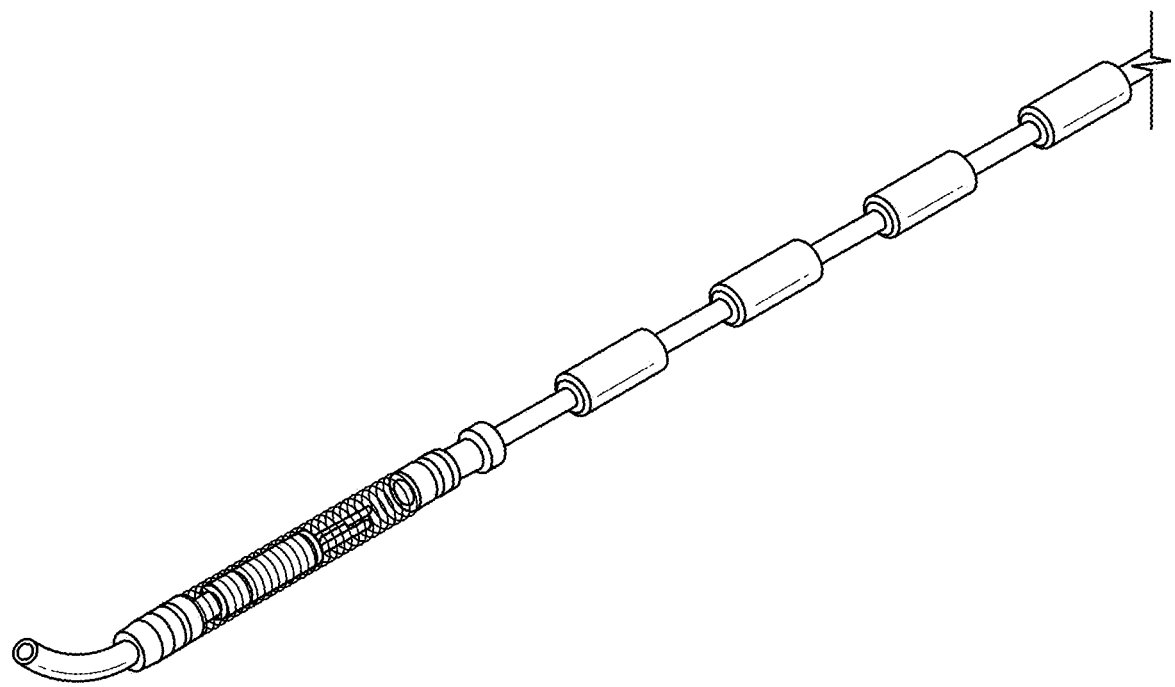
FIG. 3, which illustrates the umbilical and first vessels of the robot.
Figure 4:
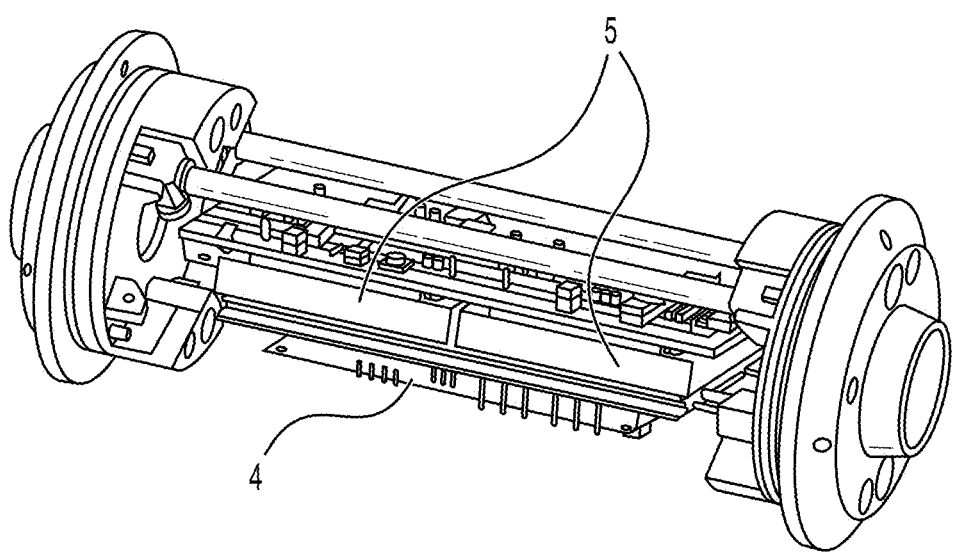
FIG. 4, which illustrates an internal detail of the first vessel of the robot, with the overvoltage protection system (4) and two converter modules (5)

FIG. 4 presents the vessel containing the overvoltage protection circuit and two of the four converter modules of the first conversion stage. In FIG. 3, the four vessels that make up the supply system are shown, two vessels of the first stage and two vessels of the second stage, with each vessel containing two converter modules of 1 kW each.

Figure 5:
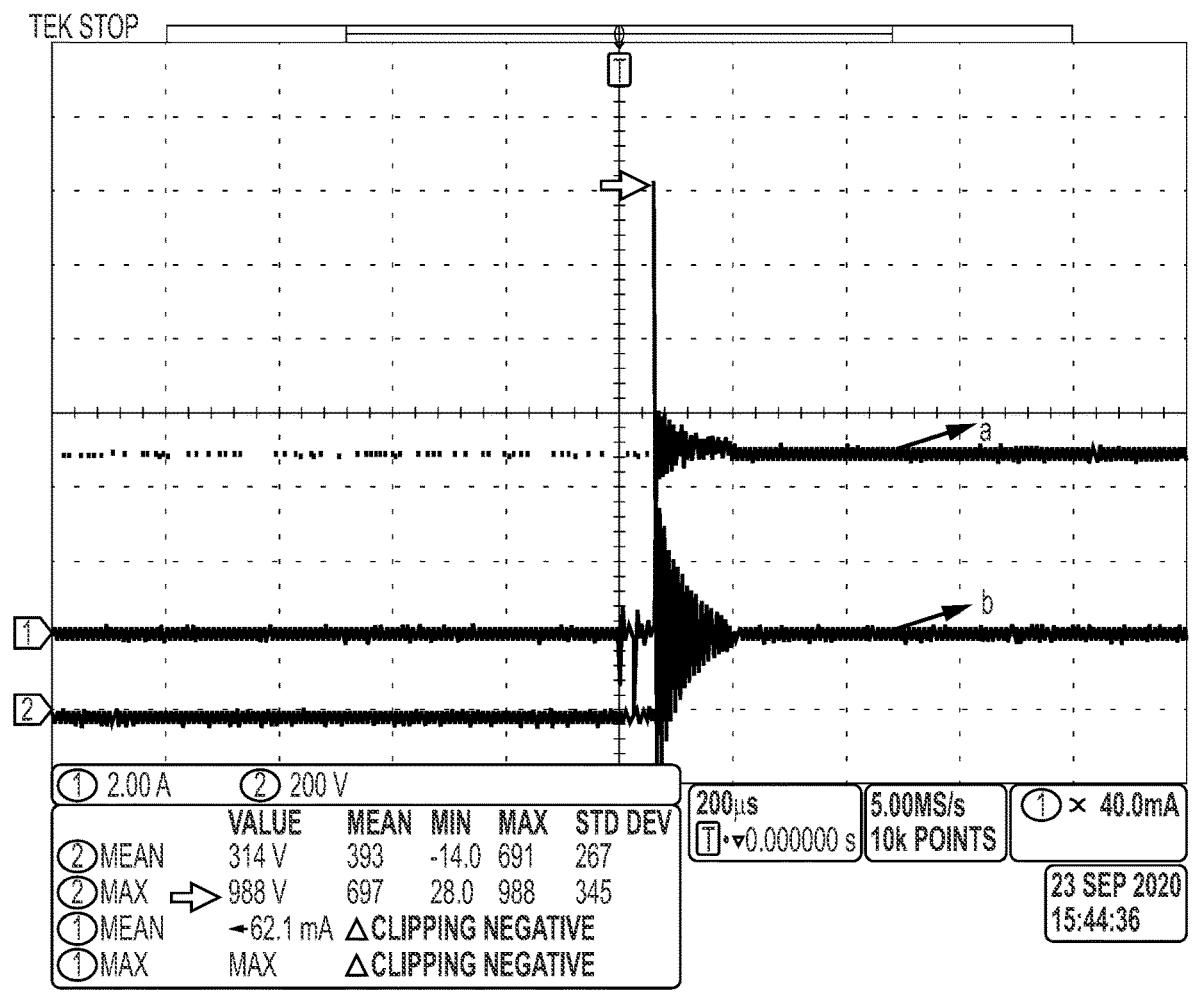
FIG. 5, which illustrates voltage (a) and current (b) waveforms before the addition of the protection circuit.
Figure 6:
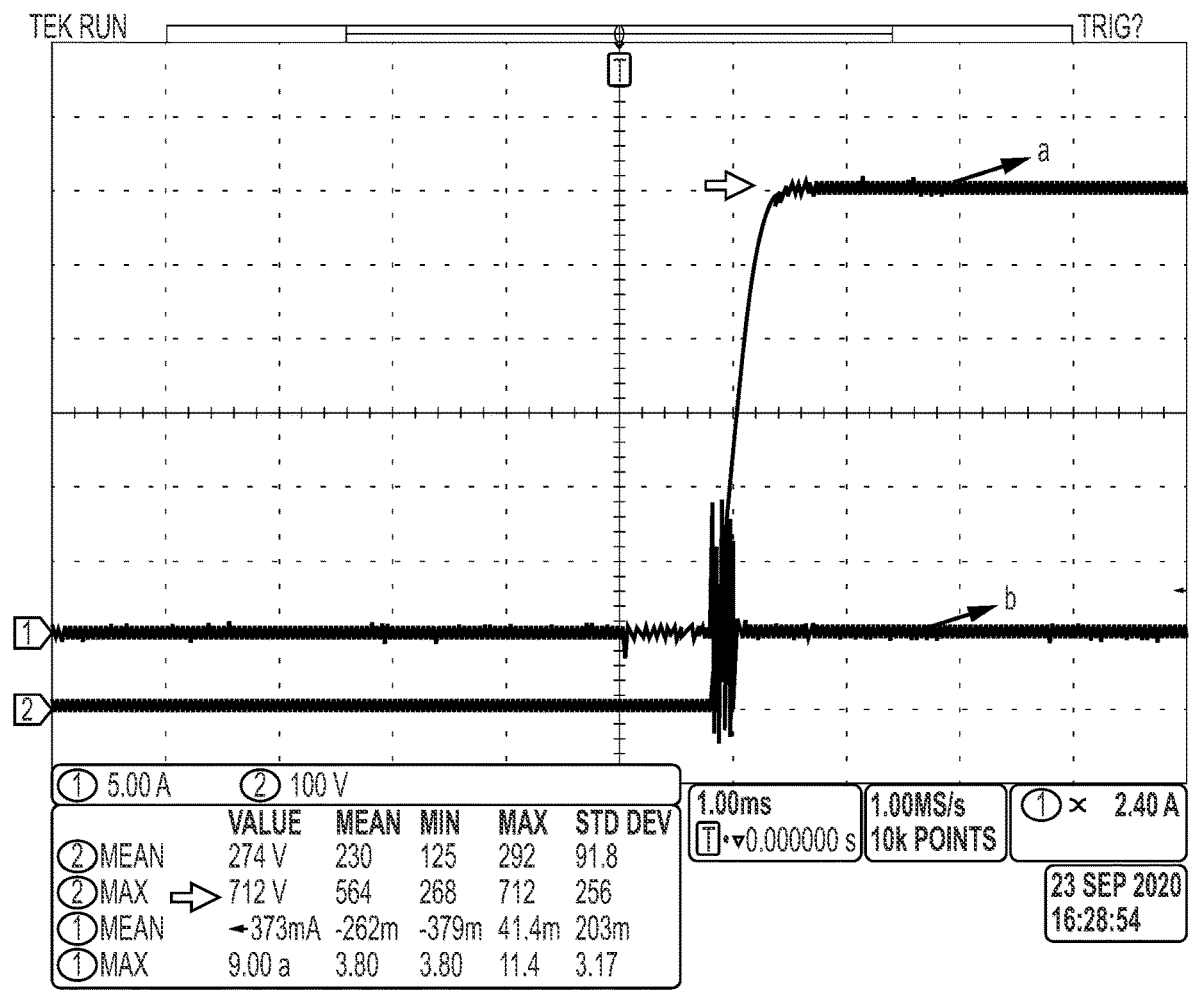
FIG. 6, which illustrates voltage (a) and current (b) waveforms after adding the protection circuit.

In FIGS. 5 and 6, it is possible to observe the voltage and current waveforms before and after the application of the protection circuit, respectively. To perform this test, a circuit of capacitances and inductances that simulate the umbilical cable was used to cause the current and voltage oscillation, which can be seen in FIGS. 5a and 5b. In this first result, there has been noted a greater oscillation in the electrical voltage and a peak of 988 V (above what is acceptable by the converters).

After the inclusion of the stabilization circuit, the energization happens smoothly (FIGS. 6a and 6b), and the voltage peak reaches a maximum of 712 V. Current oscillation remained, due to the resonant characteristic of the umbilical circuit; however, this factor is not harmful to the energy converters of the supply system of the robot.

A safe operation algorithm was developed in order to enable the monitoring and disconnection of the 48 V bus, according to the operating conditions. Each conversion module contains an external microcontroller capable of monitoring the operating conditions of the module as a whole. The monitored quantities include input current, output current, input voltage, output voltage, vessel internal temperature and vessel internal pressure. Each variable presents safe operating thresholds, and an alert is issued if any of these thresholds are exceeded.

The system of the invention is capable of enabling the operation of a robotic system for intervening pipes with internal operation in flexible lines of small diameter (for example, from 4 inches (10.16 cm)). There is further the possibility of unblocking flexible lines without the need of using pieces of equipment external to the pipe. This offers economic advantages, since it allows the pipeline to return to operation in shorter times. In addition, the technology developed should allow the recovery of lines with obstruction at distances greater than 15 km. Furthermore, the use of modules in parallel offers redundancy in case of faults, since each module can be individually commanded to start operating as needed.

The invention claimed is:

1. A power high-density DC/DC conversion system with overvoltage protection, comprising:
   a surface source;
   an umbilical cable;
   an overvoltage protection circuit; and
   a two-stage conversion modular system comprising an unregulated first conversion module and a regulated second conversion module, wherein the first conversion module is configured to lower input voltage from between 630 V and 700 V to a lower unregulated bus voltage between 36 V and 42 V, and the second conversion module is configured to convert the lower unregulated bus voltage to a regulated bus output voltage,
   wherein the second conversion module comprises a combination voltage booster and reducer module that is connected to the lower unregulated bus voltage and that is configured to convert the lower unregulated bus voltage to the regulated bus output voltage.

2. The power high-density DC/DC conversion system with overvoltage protection according to the claim 1, wherein the power high-density DC/DC conversion system with overvoltage protection uses a fixed transformation factor of approximately 16:1.

3. The power high-density DC/DC conversion system with overvoltage protection according to the claim 1, wherein the first conversion module and the second conversion module are connected in series, and wherein conversion modules within the first conversion module are connected in parallel, and conversion modules within the second conversion module are connected in parallel, to increase maximum processed power.

4. The power high-density DC/DC conversion system with overvoltage protection according to the claim 3, wherein the conversion modules within the first conversion module and the conversion modules within the second conversion module are DC/DC converters.

5. The power high-density DC/DC conversion system with overvoltage protection according to the claim 3, wherein each of the conversion modules within the first conversion module offers redundancy in case of faults and can be individually commanded to start operating as needed.

6. The power high-density DC/DC conversion system with overvoltage protection according to the claim 3, wherein each of the conversion modules within the second conversion module offers redundancy in case of faults and can be individually commanded to start operating as needed.

7. The power high-density DC/DC conversion system with overvoltage protection according to the claim 1, wherein the overvoltage protection circuit is configured to perform voltage clamping at the output of the umbilical, via one or more robotic connections, at acceptable levels for the operation of the first conversion module.

8. The power high-density DC/DC conversion system with overvoltage protection according to the claim 1, wherein the overvoltage protection circuit comprises a varistor.

9. The power high-density DC/DC conversion system with overvoltage protection according to the claim 8, wherein the overvoltage protection circuit further comprises a linear protection circuit comprising an NPN bipolar transistor and an array of Zener diodes right after the varistor.

10. The power high-density DC/DC conversion system with overvoltage protection according to claim 9, wherein the array of Zener diodes are in a series arrangement.

11. The power high-density DC/DC conversion system with overvoltage protection according to claim 10, wherein the diode arrangement has at least four 180 V diodes in series.

12. The power high-density DC/DC conversion system with overvoltage protection according to claim 10, further comprising a microcontroller configured to monitor and disconnect the regulated bus output voltage at an output of the second conversion module according to operating conditions and based on a safe operation algorithm.

13. The power high-density DC/DC conversion system with overvoltage protection according to the claim 12, wherein the second conversion module comprises the microcontroller.

14. The power high-density DC/DC conversion system with overvoltage protection according to the claim 1, wherein the regulated bus output voltage is between 0 V and 60 V.

15. A power high-density DC/DC conversion system with overvoltage protection, comprising:
   a surface source;
   an umbilical cable;
   an overvoltage protection circuit; and a two-stage conversion modular system comprising an unregulated first conversion module and a regulated second conversion module, wherein the first conversion module is configured to lower input voltage from between 630 V and 700 V to a lower unregulated bus voltage between 36 V and 42 V, and the second conversion module is configured to convert the lower unregulated bus voltage to a regulated bus output voltage, wherein the first conversion module and the second conversion module are connected in series, and wherein inputs of conversion modules within the first conversion module are connected in parallel, and conversion modules within the second conversion module are connected in parallel, to increase maximum processed power.

16. The power high-density DC/DC conversion system with overvoltage protection according to the claim 15, wherein the second conversion module comprises voltage booster, voltage reducer, or combination voltage booster and reducer modules that are connected to the lower unregulated bus voltage and that are configured to convert the lower unregulated bus voltage to the regulated bus output voltage.

17. The power high-density DC/DC conversion system with overvoltage protection according to the claim 15, wherein the second conversion module comprises voltage booster or combination voltage booster and reducer modules that are connected to the lower unregulated bus voltage and that are configured to convert the lower unregulated bus voltage to the regulated bus output voltage.

18. The power high-density DC/DC conversion system with overvoltage protection according to the claim 15, wherein the second conversion module comprises a voltage booster module that is connected to the lower unregulated bus voltage and that is configured to convert the lower unregulated bus voltage to the regulated bus output voltage.

19. The power high-density DC/DC conversion system with overvoltage protection according to the claim 15, wherein each of the conversion modules within the first conversion module offers redundancy in case of faults and can be individually commanded to start operating as needed.

20. The power high-density DC/DC conversion system with overvoltage protection according to the claim 15, wherein each of the conversion modules within the second conversion module offers redundancy in case of faults and can be individually commanded to start operating as needed.

* * * * *